United States Patent [19]
Ohwada et al.

[11] Patent Number: 5,119,380
[45] Date of Patent: Jun. 2, 1992

[54] ZERO STRING ERROR DETECTION CIRCUIT

[75] Inventors: Satoshi Ohwada; Takenao Takemura, both of Oyama; Toru Kosugi, Omiya, all of Japan

[73] Assignee: Fujitsu Limited, Kawasaki, Japan

[21] Appl. No.: 408,080

[22] Filed: Sep. 14, 1989

[30] Foreign Application Priority Data

Sep. 14, 1988 [JP] Japan .................. 63-230703

[51] Int. Cl.[5] ............... H03M 5/14; H03M 13/00
[52] U.S. Cl. .................................. 371/57.2
[58] Field of Search ............ 371/55, 56, 57.1, 57.2; 341/73

[56] References Cited

U.S. PATENT DOCUMENTS 4,503,546  3/1985  Yoshine et al. ................ 375/37

Primary Examiner—Stephen M. Baker
Attorney, Agent, or Firm—Staas & Halsey

[57] ABSTRACT

A zero string error detection circuit which detects a specified number of zeros occurring in succession in bipolar data. The detection circuit has a relatively small gate size achieved by making the shift registers in the B8ZS or B6ZS code conversion circuit serve also for zero string monitoring. The zero string error detection circuit includes a pair of shift registers which receive serial bipolar data and convert it to parallel data composed of a specified number of bits, a code detector which, upon detecting a specific code from the parallel outputs of the shift registers, issues a reset signal to the shift registers to make the outputs of the shift registers zero, a zero string monitor which issue a zero string error detection signal when the outputs of the shift registers become zero, and a gate which inhibits the zero string monitor from issuing the zero string error detection signal during a specific period when the code detector issues a reset signal.

3 Claims, 7 Drawing Sheets

ZERO STRING ERROR DETECTION CIRCUIT

BACKGROUND OF THE INVENTION

1. Field of the Invention

This invention concerns a zero string error detection circuit which detects a string of zeros in bipolar data.

In digital transmission for audio data and other data, for example, the clock for playback synchronization and data recognition is extracted from the audio data. The clock cannot be extracted if zeros occur in succession as in the condition of no sound. If data is transmitted in 8-bit units, eight successive zeros are converted to an 8-bit code (B8ZS code) in a specific pattern. If data is transmitted in 6-bit units, six successive zeros are converted to a 6-bit code (B6ZS code) in a specific pattern.

At the receiving end, this code, when detected, is returned to the original string of zeros. This means that normally, no zero signal should be detected during the period from the time of conversion at the transmitting end to the time of restoration at the receiving end.

However, when a fault occurs in the transmission path or other facilities, zero signals may occur. Therefore, transmission systems are designed so that when a specified number of zero bits are detected, a signal indicating a zero string error (zero string error detection signal) is issued and when the zero string error detection signal is issued a number of times in succession, an alarm is issued to the transmitting end.

2. Description of the Related Art

FIG. 6 is a circuit diagram of a conventional zero string error detection circuit. In this figure, 1P and 1N represent shift registers. Shift register 1P receives the positive side of serial bipolar data P and converts it to parallel data composed of a specific number (8, for example) of bits. Shift register 1P receives the negative side of serial bipolar data N and converts it to parallel data composed of a specific number (8, for example) of bits.

Component 2 is a B8ZS code detector. When it receives a B8ZS code (000VB0VB, where V is a code which indicates that the data does not conform to the coding rule and B is a code which indicates that the data conforms to the coding rule—for example, if the output of shift register 1P is 00010001 and the output of shift register 1N is 00001010, the B8ZS code is detected) from parallel outputs FF1–FF8 and FF1'–FF8' from the shift registers, it issues a reset signal FRST to shift registers 1P and 1N to make the 1P and 1N outputs zero.

Components 3P and 3N are 8-bit zero monitors. Eight-bit zero monitor 3P outputs a zero string error detection signal when it finds a string of eight bits of zero in bipolar data P. Eight-bit zero monitor 3N outputs a zero string error detection signal when it finds a string of eight bits of zero in bipolar data N. As indicated in FIG. 7, eight-bit zero monitors 3P and 3N are fitted with an eight-bit shift register 3P-1 (3N-1) and a NOR gate 3P-2 (3N-2) which receives the output of shift register 3P-1 (3N-1).

The zero string detection signals are fed via an AND gate to an alarm controller which is not shown. When the alarm controller detects the zero string detection signal a specific number of times in succession, it sends an alarm to the transmitting end or other components.

Component 5 is an OR gate for extracting output data. It receives the sixth outputs FF6 and FF6' of shift registers 1P and 1N and outputs their OR as serial data.

When B8ZS code detector 2 detects a B8ZS code in outputs from shift registers 1P and 1N in the above configuration, it issues a reset signal FRST to shift registers 1P and 1N to make the outputs of shift registers 1P and 1N zero. As a consequence, the B8ZS code is returned to eight bits of zero.

If zeros occur in succession because of a fault in the transmission path or other components, eight-bit zero monitors 3P and 3N issue zero string error detection signals, respectively. If the zero string error detection signals are issued a number of times in succession, the alarm controller issues an alarm to the transmitting end.

Zero string error detection systems where a B6ZS code is detected have similar configurations and functions.

The above conventional zero string error detection circuit with a B8ZS code converter involves a problem that a large-scale gate circuit must be used because zero strings are detected both in bipolar data P and in bipolar data N.

A similar problem is involved in a zero string error detection circuit which handles B6ZS codes.

SUMMARY OF THE INVENTION

This invention has been made considering the above problem. It is intended to provide a zero string error detection circuit characterized by a relatively small gate size achieved by making the shift register in the B8ZS or B6ZS code converter serve also to monitor strings of zeros.

BRIEF DESCRIPTION OF THE DRAWINGS

FIGS. 4(a)–4(c), is a timing chart illustrating the procedure for mask signal generation;

FIGS. 5(a)–5(c), is a timing chart illustrating the function available in the embodiment of the present invention;

DESCRIPTION OF THE PREFERRED EMBODIMENT OF THE INVENTION

Figure 1:
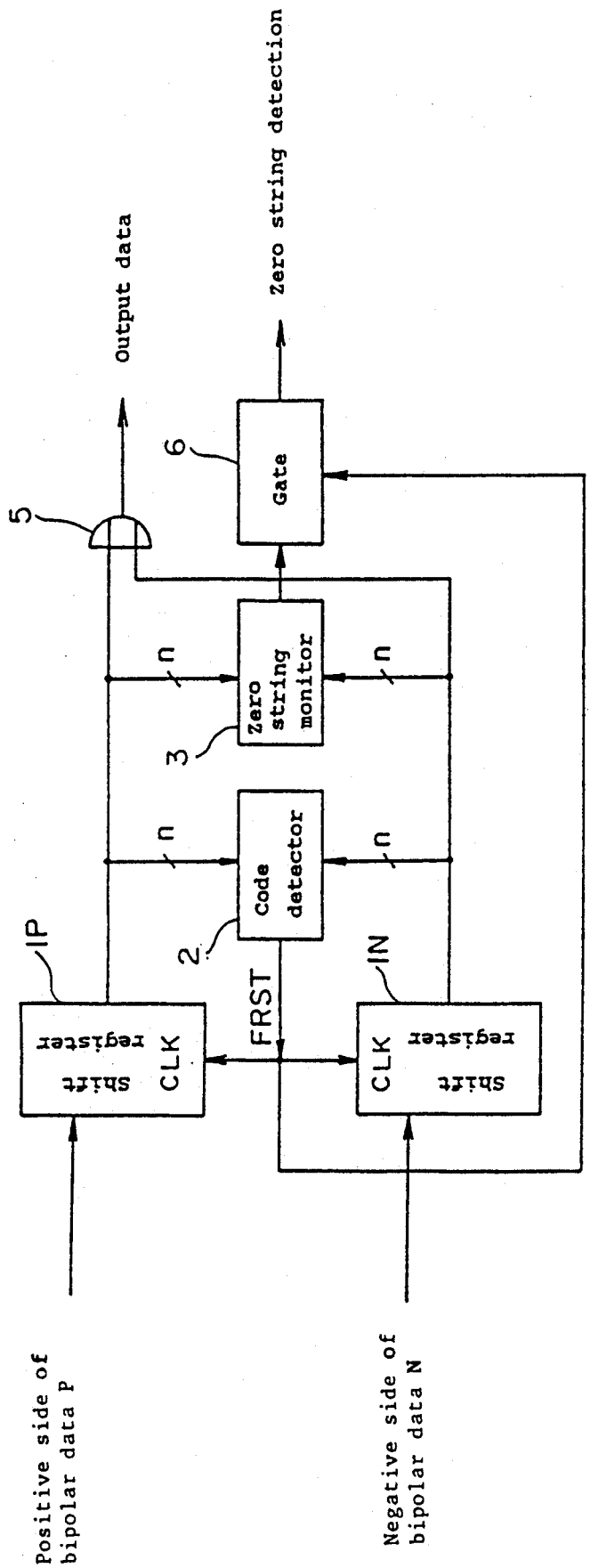
FIG. 1 is a block diagram of a zero string detection circuit according to the present invention.

FIG. 1 is a block diagram of a zero string detection circuit according to the present invention.

In FIG. 1, components 1P and 1N are a pair of shift registers which receive positive side bipolar data P and negative side of bipolar data N respectively which are input serially. The shift registers convert the serial data to parallel data having n bits (where n is a natural number). Component 2 is a code detector which, upon receiving a specific code in parallel outputs from shift registers 1P and 1N, issues a reset signal FRST to shift registers 1P and 1N to make the outputs of shift registers 1P and 1N zero.

Component 3 is a zero string monitor which issues a zero string error detection signal when the parallel outputs of shift registers 1P and 1N become zero. Component 6 is a gate which, upon receiving the reset signal FRST from code detector 2, inhibits zero string monitor 3 from issuing a zero string error detection signal during a specific period.

Component 5 is an OR gate for extracting output data.

When code detector 2 detects a specific code in the outputs of shift registers 1P and 1N in the above configuration, it issues the reset signal FRST to shift registers 1P and 1N to make the outputs of shift registers 1P and 1N zero. As a consequence, the specific code is returned to the original number of zero bits.

Upon receiving the reset signal FSRT from code detector 2, gate 6 inhibits zero string monitor 3 from issuing the zero string error detection signal during a specific period. During this period, no alarm is issued to the transmitting end even when a zero string is detected.

If zeros occur in succession because of a fault in the transmission path or other components, zero string monitor 3 issues a zero string detection error signal. Since code detector 2 does not issue a reset signal FRST even when the zero string continues, the mask function of gate 6 is disabled. If the zero string error detection signal is issued a number of times in succession, an alarm or other information is issued to the transmitting end.

Figure 2:
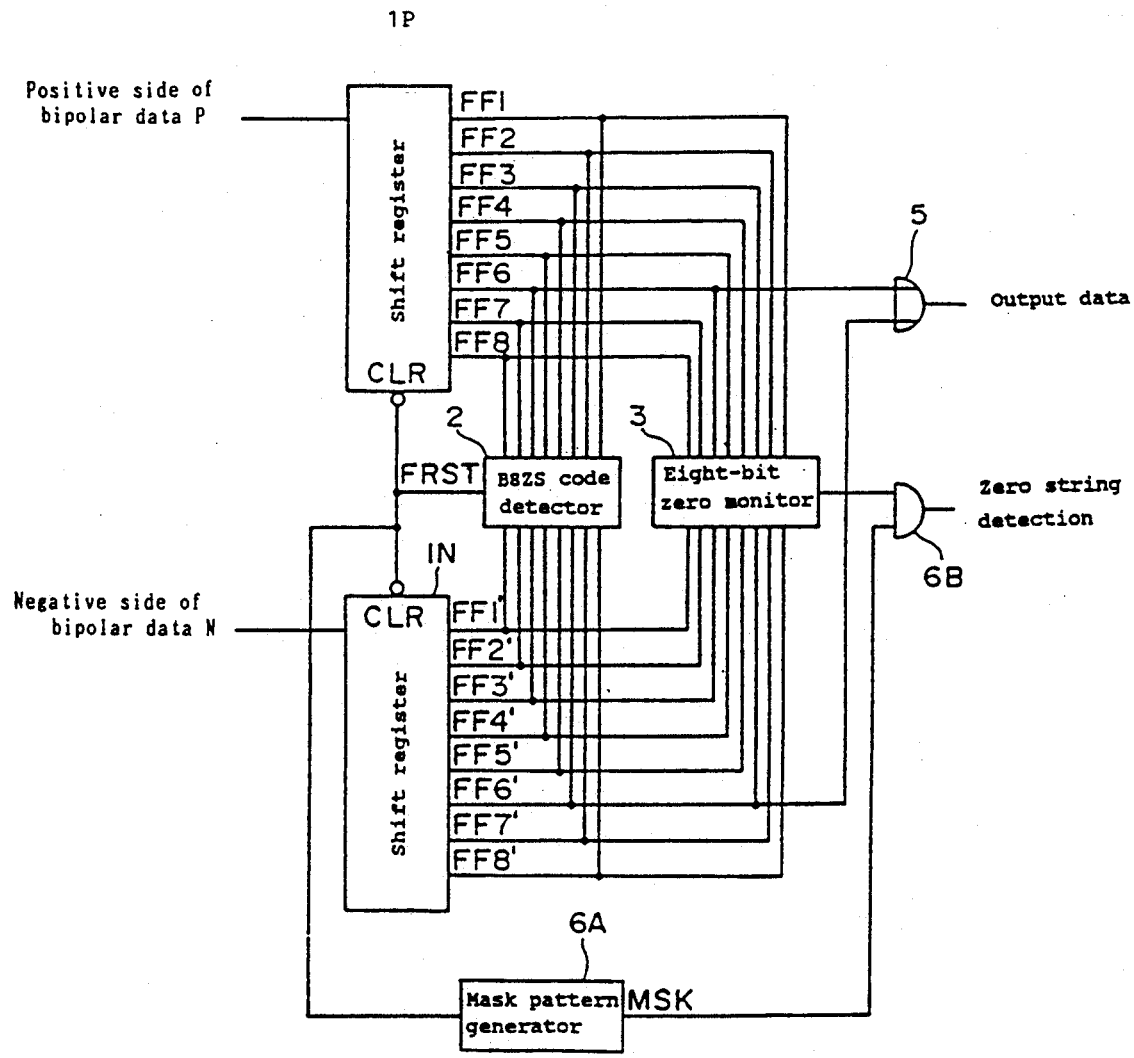
FIG. 2 is a circuit diagram of an embodiment according to the present invention.

FIG. 2 is a block diagram of an embodiment according to the present invention. In FIG. 2, components 1P and 1N are shift registers, component 2 is a B8ZS code detector, and component 3 is an eight-bit zero monitor.

Figure 6:
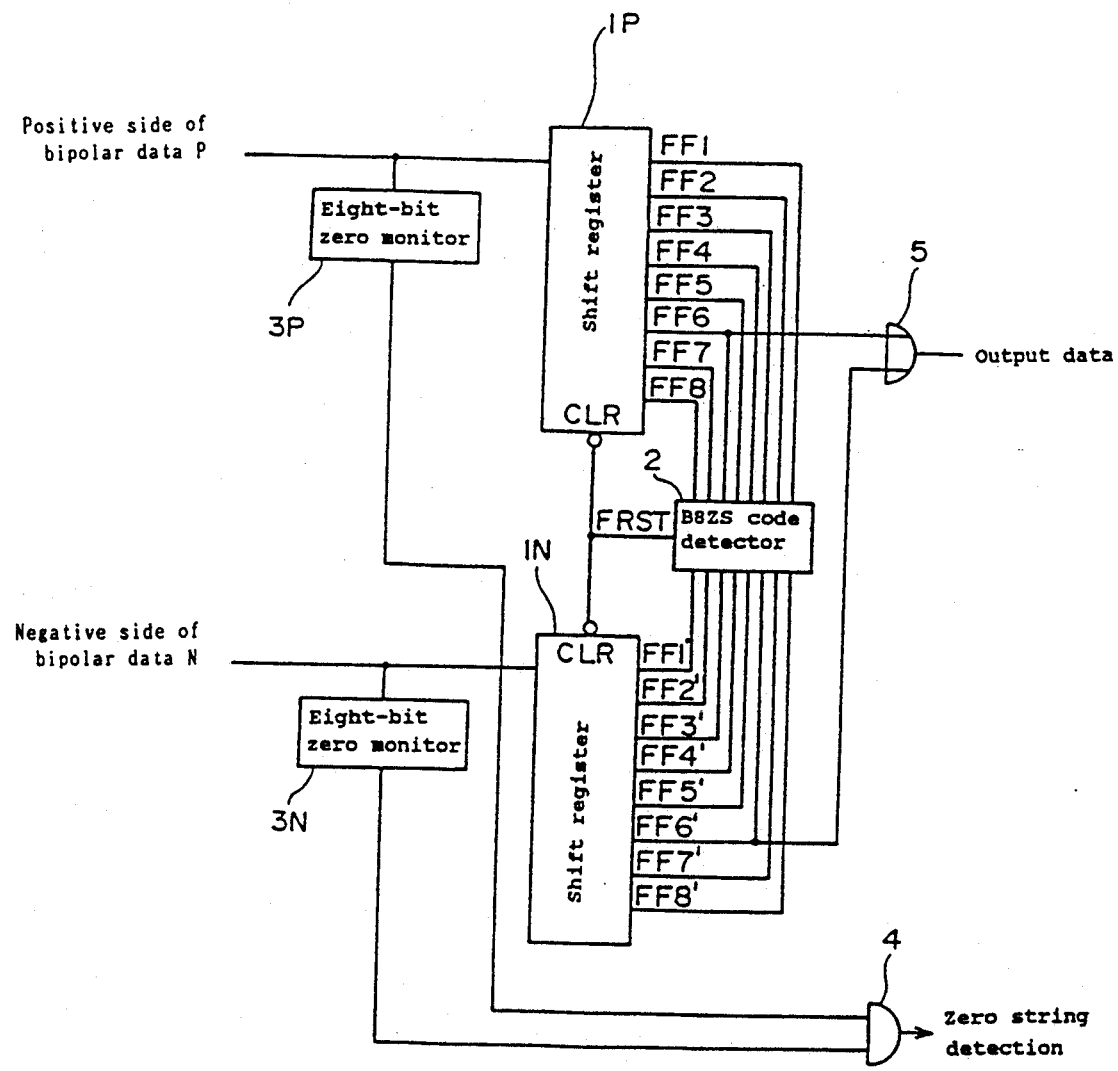
FIG. 6 is an electric circuit diagram of a prior art zero string detection circuit.
Figure 7:
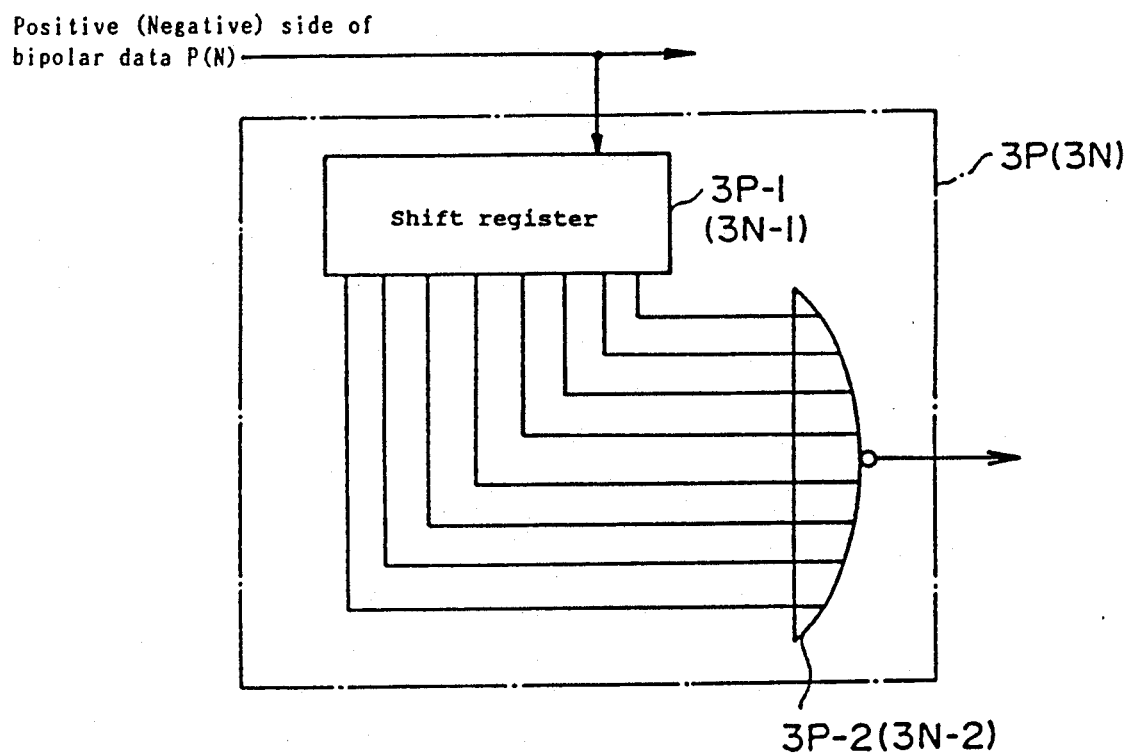
FIG. 7 is a circuit diagram of a prior art eight-bit zero monitor.

Shift registers 1P and 1N and B8ZS code detector 2 are the same as those in the conventional circuit shown in FIG. 6. Therefore, their detailed explanation is omitted here.

Figure 3:
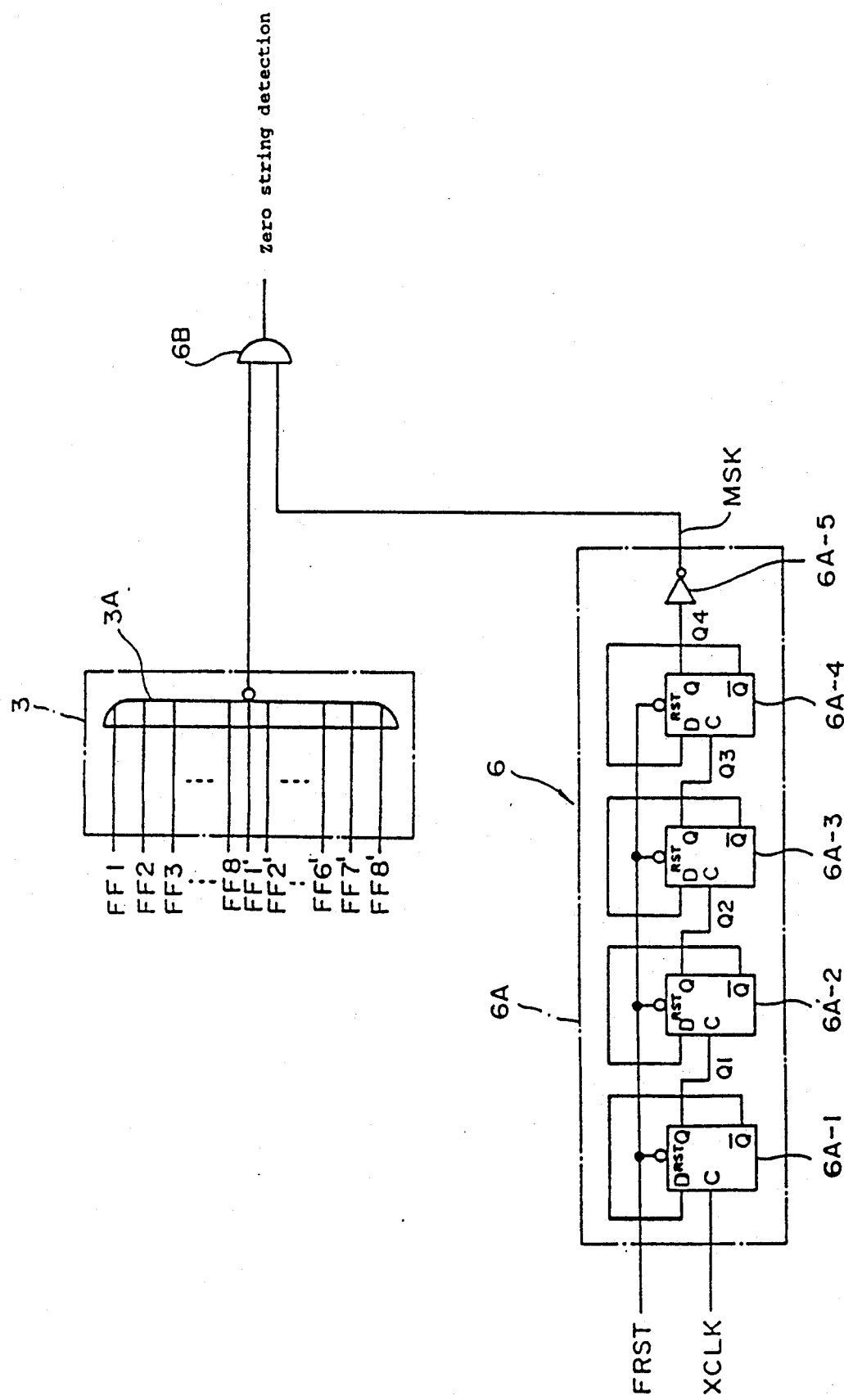
FIG. 3 is a detailed circuit diagram showing a principal part of the embodiment of the present invention.

Eight-bit zero monitor 3 issues a zero string error detection signal when the parallel outputs FF1-FF8 and FF1'-FF8' of shift registers 1P and 1N become zero. As indicated in FIG. 3, it is fitted with a 16-input NOR gate 3A which receives parallel outputs FF1-FF8 and FF1'-FF8' from shift registers 1P and 1N.

In addition, gate 6B is provided to inhibit eight-bit zero monitor 3 from issuing a zero string error detection signal during a specified period (corresponding to eight clock cycles) when the reset signal FRST is output from B8ZS code detector 2.

Figure 4:
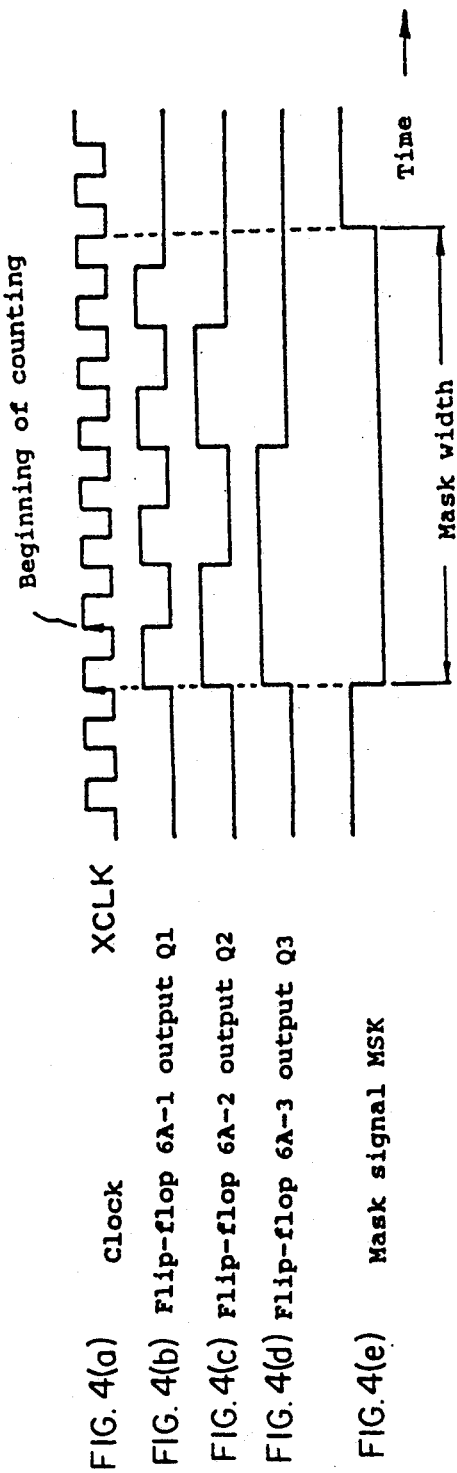
FIG. 4, including

When B8ZS code detector 2 issues a reset signal FRST, mask pattern generator 6A outputs a mask signal MSK during the above period. As indicated in FIG. 3, its circuit is a combination of a frequency divider fitted with four flip-flops 6A-1, 6A-2, 6A-3, and 6A-4 and an inverter 6A-5. FIGS. 4(a)-(4e) show the waveforms of the clock input to mask pattern generator 6A and other signals.

In FIG. 2, component 5 is an OR gate for extracting output data from sixth outputs FF6 and FF6' of shift registers 1P and 1N.

When B8ZS code detector 2 detects a B8ZS code in the outputs of shift registers 1P and 1N in the above configuration, it issues the reset signal FRST to shift registers 1P and 1N to make the output of shift registers 1P and 1N zero. As a consequence, the B8ZS code is returned to eight bits of zero.

When B8ZS code detector 2 issues the reset signal FRST, mask pattern generator 6A outputs the mask signal MSK to AND gate 6B during eight clock cycles. This inhibits eight-bit zero monitor 3 from outputting the zero string error detection signal. Therefore, an alarm or other information indicating the detection of a zero string is not issued to the transmitting end.

If zeros occur in succession because of a fault in the transmission path or other components, eight-bit zero monitor 3 issues a zero string error detection signal. However, B8ZS code detector does not issue a reset signal FRST even when the zero string continues. Therefore, the mask function of gate 6 containing mask pattern generator 6A is disabled. If the zero string error detection signal is issued a number of times in succession, an alarm controller (not shown) which has received those detection signals issues an alarm and other information to the transmitting end.

Figure 5:
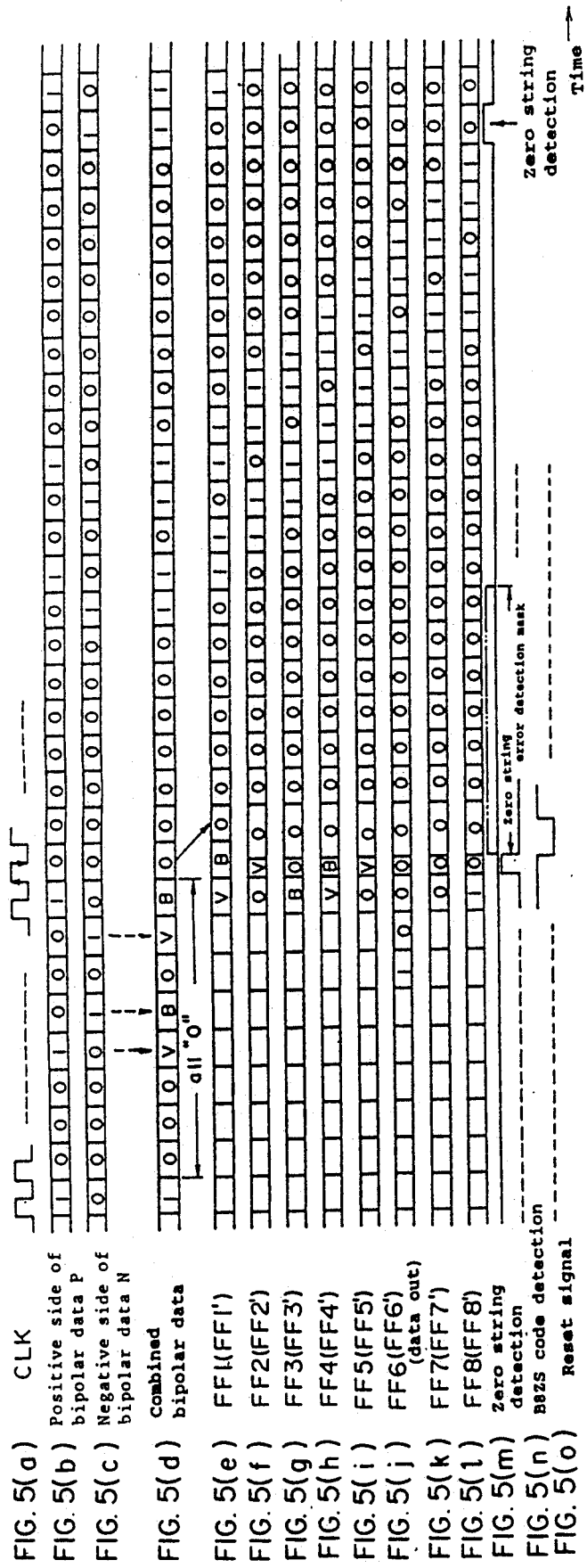
FIG. 5, including

FIGS. 5(a)-5(o) are timing charts which apply to the above implementation sample. FIG. 5(a) is the waveform of a clock CLK (synchronized with clock XCLK) supplied to shift registers 1P and 1N; FIGS. 5(b) and 5(c) show states 0 and 1 of the positive and negative side of bipolar data P and N; FIG. 3(d) shows the combination of the positive and negative side of bipolar data P and N; FIG. 5(e)-5(l) show outputs FF1-FF8 (FF1'-FF8') of shift register 1P (1N); FIG. 5(m) shows the waveform of the zero string error detection signal; FIG. (n) is a timing chart for B8ZS code detection; FIG. 3(o) is a timing chart for the reset signal FRST output.

FIG. 5(d) shows data which is obtained when the data P and data N shown in FIGS. 5(b) and 5(c) respectively, are combined. For simplification, this will be explained supposing that the data is serially input to shift registers 1P and 1N and output in parallel.

Entering all data into shift registers 1P and 1N results in outputting in parallel as shown in FIG. 5(e)-FIG. 5(l). This output is entered into B8ZS code detector 2 and detected as codes. Actually, the parallel outputs of data P and data N shown in FIGS. 5(b) and FIG. 5(c) are designed to be subjected to code detection respectively as shown in FIG. 5(o).

When data indicating all "0's" is converted into parallel data by shift registers 1P and 1N, a detection signal is output as shown in FIG. 5(n), followed by reset signals issued to shift registers 1P and 1N. Then, shift registers FF1-FF8 (FF1'-FF8') output 0 only. As shown in FIG. 5(m) by a two-dot and dash line as "Zero string error detection mask", a mask signal is issued.

The mask signal itself has a width of only 7 bits, because the final output is obtained from the output FF6 (FF6'). More specifically, the code indicating all "0's" is "000VB0VB", and when all zeroes are detected, output "0" has already been obtained from the output FF6 (FF6').

Meanwhile, when 8 bits of zero are entered in shift registers 1P and 1N, the detection signal is issued as shown in FIG. 5(m).

The gate size can be made much smaller than in the conventional circuit because shift registers 1P and 1N in the B8ZS code conversion circuit can also be used for eight-bit zero monitoring.

Obviously, this invention is applicable to zero string error detection circuits which detect a B6ZS code.

It is to be understood that the foregoing description is merely illustrative of the preferred embodiments of the present invention, and that the present invention is not to be limited thereto, but is to be determined by the scope of the appended claims.

What is claimed is:

1. A zero string error detection circuit comprising:

a pair of shift registers for serially receiving, respectively, a positive side and negative side of bipolar data, converting it to parallel data composed of a required number of bits and outputting the parallel data, the output parallel data comprising current signals from a transmission line;

a code detector, operatively connected to said pair of shift registers for receiving the output parallel data, said code detector, upon detecting a specific code in the parallel outputs of said shift registers, outputting a reset signal to said shift registers for making the parallel outputs of said shift registers zero;

a zero string monitor, operatively connected to said shift registers, for outputting a zero string error detection signal when the parallel outputs of said shift registers become zero, said zero string monitor including a NOR GATE for receiving the output parallel data from said shift registers; and mask pattern generator means, operatively connected to said code detector and said zero string monitor, inhibiting said zero string monitor from outputting a zero string error detection signal during a specific period when said code detector outputs said reset signal.

2. A zero string error detection circuit according to claim 1, wherein said mask pattern generator means includes:

a mask pattern generator; and an AND gate operatively connected to said mask pattern generator and said zero string monitor.

3. A zero string error detection circuit according to claim 2, wherein said mask pattern generator has a capability of outputting a mask signal during the period said reset signal is output from said code detector.

* * * * *

UNITED STATES PATENT AND TRADEMARK OFFICE
CERTIFICATE OF CORRECTION

PATENT NO. : 5,119,380
DATED : JUNE 2, 1992
INVENTOR(S) : SATOSHI OHWADA ET AL.

It is certified that error appears in the above-identified patent and that said Letters Patent is hereby corrected as shown below:

Col. 2, line 42, "4(a)-4(c)," should be --4(a)-4(e),--;
        line 44, "5(a)-5(c)," should be --5(a)-5(o),--;
        line 48, "circuit;" should be --circuit; and--.

Col. 4, line 19, "FIG. 3(d)" should be --FIG. 5(d)--;
        line 24, "FIG. (n)" should be --FIG. 5(n)--;
        line 25, "FIG. 3(o)" should be --FIG. 5(o)--.

Signed and Sealed this

Tenth Day of August, 1993

Attest:

MICHAEL K. KIRK

*Attesting Officer*      *Acting Commissioner of Patents and Trademarks*